(12) United States Patent
Cuzin et al.

(10) Patent No.: US 10,523,600 B2
(45) Date of Patent: Dec. 31, 2019

(54) METHOD AND SYSTEM TO PROVIDE SECONDARY CONTENT TO A SECOND DEVICE

(71) Applicant: OPENTV, INC., San Francisco, CA (US)

(72) Inventors: Guillaume Cuzin, Montesson (FR); Bertrand Chollet, Maurepas (FR); Corrado Longoni, Paris (FR)

(73) Assignee: OPENTV, INC., San Francisco, CA (US)

( * ) Notice: Subject to any disclaimer, the term of this patent is extended or adjusted under 35 U.S.C. 154(b) by 44 days.

(21) Appl. No.: 15/523,903

(22) PCT Filed: Oct. 30, 2015

(86) PCT No.: PCT/EP2015/075245
§ 371 (c)(1),
(2) Date: May 2, 2017

(87) PCT Pub. No.: WO2016/071222
PCT Pub. Date: May 12, 2016

(65) Prior Publication Data
US 2017/0339078 A1    Nov. 23, 2017

(30) Foreign Application Priority Data
Nov. 3, 2014   (EP) .................................. 14191511

(51) Int. Cl.
*G06F 15/16* (2006.01)
*H04L 12/58* (2006.01)
(Continued)

(52) U.S. Cl.
CPC ............. *H04L 51/04* (2013.01); *G06Q 30/02* (2013.01); *H04M 3/4878* (2013.01);
(Continued)

(58) Field of Classification Search
CPC .................... H04N 21/6125; H04N 21/25891
See application file for complete search history.

(56) References Cited

U.S. PATENT DOCUMENTS 8,473,350 B1 *   6/2013   Bouret ................... G06Q 30/00
                                                                   705/14.66
9,825,774 B2 *  11/2017   Park ..................... H04L 12/2825
(Continued)

FOREIGN PATENT DOCUMENTS

CN       101288093 A     10/2008
CN       103299329 A      9/2013
(Continued)

OTHER PUBLICATIONS

International Search Report issued in International Application No. PCT/EP2015/075245 dated Jan. 28, 2016.
(Continued)

*Primary Examiner* — Hieu T Hoang
(74) *Attorney, Agent, or Firm* — Schwegman Lundberg & Woessner, P.A.

(57) ABSTRACT

A method and system to share advertisement content from a main reception device to a secondary reception device. The method comprising steps of: receiving a transmitted content containing at least one advertisement topic on the main reception device from a transmission center, said main reception device being associated with a user identification, selecting the advertisement topic for sharing ad content with the secondary reception device, retrieving an identifier related to said advertisement topic, selecting one destination address corresponding to a secondary device, sending a notification to a management center, said notification comprising at least the ad identifier, the destination address and the user identification, storing, in a database at the management center in a user record corresponding to the user identification, at least the ad identifier and the destination
(Continued)

address, retrieving an ad content corresponding to the ad identifier, pushing the advertisement content to the secondary device corresponding to the destination address.

15 Claims, 2 Drawing Sheets

(51) Int. Cl.
   *G06Q 30/02* (2012.01)
   *H04M 3/487* (2006.01)
   *H04M 7/00* (2006.01)
   *H04N 21/258* (2011.01)
   *H04N 21/61* (2011.01)

(52) U.S. Cl.
   CPC ...... *H04M 7/0027* (2013.01); *G06Q 30/0241* (2013.01); *H04N 21/25891* (2013.01); *H04N 21/6125* (2013.01)

(56) References Cited

U.S. PATENT DOCUMENTS

| | | | |
|---|---|---|---|
| 2003/0229900 A1* | 12/2003 | Reisman | G06F 16/954 725/87 |
| 2008/0195466 A1* | 8/2008 | Wright | G06Q 30/02 705/14.41 |
| 2009/0199230 A1 | 8/2009 | Kumar et al. | |
| 2011/0282906 A1* | 11/2011 | Wong | G06F 16/434 707/780 |
| 2011/0321085 A1* | 12/2011 | Debois | G06Q 30/02 725/34 |
| 2012/0004958 A1* | 1/2012 | Bloom | G06Q 30/0241 705/14.4 |
| 2012/0174158 A1* | 7/2012 | Mowrey | H04N 21/4126 725/40 |
| 2012/0177067 A1* | 7/2012 | Cho | H04N 21/4126 370/503 |
| 2012/0227076 A1* | 9/2012 | McCoy | H04N 21/2387 725/110 |
| 2012/0278173 A1 | 11/2012 | Vaidyanathan et al. | |
| 2014/0006176 A1* | 1/2014 | Gudlavenkatasiva | G06Q 30/02 705/14.73 |

FOREIGN PATENT DOCUMENTS

| | | |
|---|---|---|
| EP | 3016362 A1 | 5/2016 |
| EP | 3216200 A1 | 9/2017 |
| JP | 2004180272 A | 6/2004 |
| JP | 2007043474 A | 2/2007 |
| JP | 2007274704 A | 10/2007 |
| JP | 2013105146 A | 5/2013 |
| JP | 2013211828 A | 10/2013 |
| JP | 2018501691 A | 1/2018 |
| WO | WO-0180553 A1 | 10/2001 |
| WO | WO 2002/059820 | 8/2002 |
| WO | WO 2008/016634 | 2/2008 |
| WO | WO-2012176931 A1 | 12/2012 |
| WO | WO-2016071222 A1 | 5/2016 |

OTHER PUBLICATIONS

Written Opinion issued issued in International Application No. PCT/EP2015/075245 dated Jan. 28, 2016.
"Australian Application Serial No. 2015342027, First Examination Report dated Dec. 15, 2017", 4 pgs.
"European Application Serial No. 14191511.6, Extended European Search Report dated May 13, 2015", 7 pgs.
"European Application Serial No. 15787227.6, Response filed Dec. 12, 2017 to Communication pursuant to Rules 161(1) and 162 EPC dated Jun. 12, 2017", 7 pgs.
"International Application Serial No. PCT/EP2015/075245, International Preliminary Report on Patentability dated May 18, 2017", 9 pgs.
"Australian Application Serial No. 2015342027, Response filed Aug. 30, 2018 to First Examination Report dated Dec. 15, 2017", 66 pgs.
"European Application Serial No. 15787227.6, Communication Pursuant to Article 94(3) EPC dated Jun. 26, 2018", 3 pgs.
"European Application Serial No. 15787227.6, Communication Pursuant to Article 94(3) EPC dated Aug. 16, 2018", 4 pgs.
"European Application Serial No. 15787227.6, Response filed Jul. 30, 2018 to Communication Pursuant to Article 94(3) EPC dated Jun. 26, 2018", 7 pgs.
"European Application Serial No. 15787227.6, Response filed Feb. 25, 2019 to Communication Pursuant to Article 94(3) EPC dated Aug. 16, 2018", 10 pgs.
"Chinese Application Serial No. 201580059808.X, Office Action dated Jun. 3, 2019", w/ English Translation, 39 pgs.
"Japanese Application Serial No. 2017-523898, Notification of Reasons for Refusal dated Aug. 27, 2019", With English Translation, 13 pgs.

* cited by examiner

METHOD AND SYSTEM TO PROVIDE SECONDARY CONTENT TO A SECOND DEVICE

CROSS REFERENCE TO RELATED APPLICATIONS

This application is a U.S. National Stage Application of International Application No. PCT/EP/2015/075245 filed Oct. 30, 2015, which claims priority from European Patent Application No. 14191511.6 filed Nov. 3, 2014.

INTRODUCTION

The present invention aims at providing a possibility to share advertisement contents from a main device to a secondary device.

BACKGROUND

Delivery of advertisements is well known and various solutions are proposed to broadcast targeted advertisements according to the profile and the habits of the user. A first solution is described in the document U.S. Pat. No. 778,868, in which the ad stream is conveyed concurrently with a broadcast stream. Based on user profile, a receiver selects one ad from the plurality of ads.

Other solutions such as the one described in WO 2002/59820 are based on the registration of the online user's login time and the preparation of a list of advertisements in accordance with the delivery requirements set by the advertisers and the profile of the local user.

It is therefore a common aim for advertisers to try to deliver the advertisements having the highest chance to catch the interest of the targeted user.

BRIEF DESCRIPTION OF THE INVENTION

According to an embodiment of the invention, a method to share ad content from a main reception device to a secondary reception device is described, the method comprising the steps of:
receiving a transmitted content containing at least one advertisement topic on the main reception device from a transmission center, said main reception device being associated with a user identification,
selecting the advertisement topic for redistribution,
retrieving an identifier related to said advertisement topic,
selecting one destination address corresponding to a secondary device,
sending a notification to a management center, said notification comprising at least the ad identifier, the destination address and the user identification,
storing, in a database of the management center in a user record corresponding to the user identification, at least the ad identifier and the destination address,
retrieving an ad content corresponding to the ad identifier,
pushing the advertisement content to the secondary device corresponding to the destination address.

In the same manner, it is proposed a system in charge of sharing ad contents comprising a transmission center, a management center having a database and at least one main reception device being associated with a user identification, said main reception device being configured to:
receive a transmitted content containing at least one advertisement topic from the transmission center,
select the advertisement topic for redistribution,
retrieve an ad identifier related to said advertisement topic,
select one destination address corresponding to a secondary reception device,
send a notification to the management center, said notification comprising at least the ad identifier, the destination address and the user identification,
and the management center is configured to:
receive the notification from the main reception device,
store, in a user's record corresponding to the user identification of its database, at least the ad identifier and the destination address,
retrieve an advertisement content corresponding to the ad identifier,
push the advertisement content to the secondary device corresponding to the destination address.

One advantage of this method and system is that the selection of the advertisement content is carried out by a relative, (e.g. a friend) of the targeted user. The attention level to such an advertisement is therefore much higher since it is recommended by a trusted person (your friend) and the subject should be in line with your center of interest.

BRIEF DESCRIPTION OF THE FIGURES

The present invention will be better understood thanks to the attached figures in which.

DETAILED DESCRIPTION

A transmission center TrCnt is understood as a center being able to transmit a video content to a main reception device MDev. The transmission can be traditional broadcast, broadcast over IP, multicast, unicast (e.g. for video on demand), point-to-point. As said, the transmission can be one to many, i.e. many reception devices receive the same content, or the content can be prepared and sent to the sole usage of the main device (e.g. video on demand). The common features of all embodiments are the following:
a user, on its main reception device receives a transmitted content,
an action is taken by the user to share an advertisement with another person, having a second reception device and a destination address,
an ad topic is determined by the user,
an ad identifier is determined by the main reception device in relation with the ad topic,
a notification is sent to a management center by the main reception device comprising its identification, the ad identifier and the destination address,
a record is updated at the management center to keep track of this action,
the management center then retrieves an advertisement content corresponding with the ad identifier, and pushes the advertisement content to the second reception device as identified by the destination address.

First of all, it is to be noted that the transmission center and the management center can be the same entity or two distinct entities. In the second example, the operation of pushing an advertisement content to the secondary device is carried out according to the following examples:

one function of the transmission center is to transmit ad content to the secondary device. For that purpose, the management center, after receiving the notification from the main device, send a management notification to the transmission center containing the ad identifier and the secondary device address. The ad content, corresponding to the ad identifier, is retrieved by the transmission center and is introduced into the stream toward the secondary device.

one function of the management center is to push ad content to the secondary device. For that purpose, the secondary device is able to receive content from the transmission center and the management center. The nature of the connection could be different, for example the transmission center sending broadcast video content and the management center having a point-to-point (e.g. IP) connection with the secondary device. The latter can merge the content from both sources to obtain an enhanced display.

The examples below can be implemented according to the two solutions proposed above. For the rest of the description, we will consider the solution with the management center receiving the notification from the main device and being able to push contents directly to the secondary device. However, the other embodiments implying the transmission center are equally part of the present description.

Figure 3:
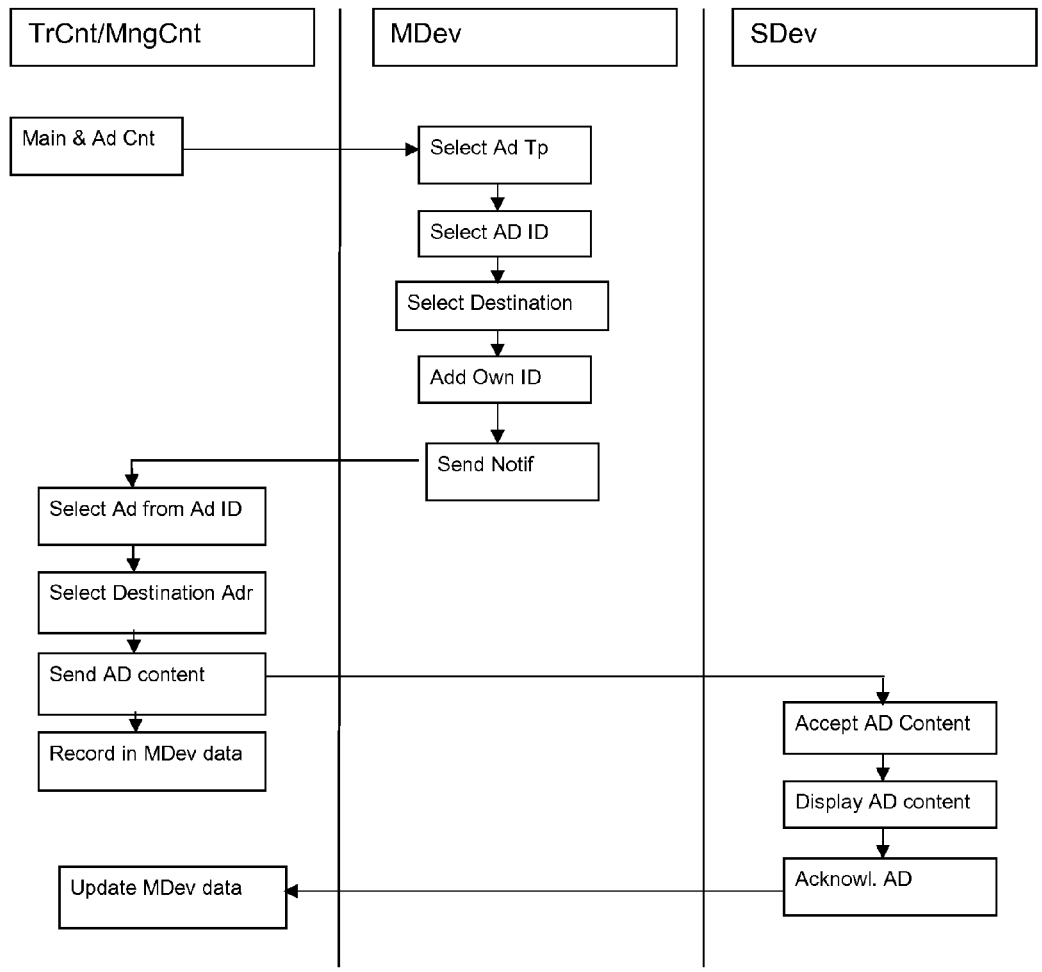
FIG. 3 illustrates the flow chart of one embodiment of the invention.

The FIG. 3, illustrates the various exchanges between the different entities. One action made by the user of the main device MDev is the selection of an advertisement topic. An advertisement topic is a subject about which the main user wishes to make his friend aware of. It could be an advertisement content currently transmitted, or an advertisement content related to the one currently transmitted (e.g. an ad for a particular model is transmitted and I wish to pass an advertisement for another product of this manufacturer), or an object on the scene currently transmitted or an object or an ad that was previously transmitted.

At a certain time during the transmission of a video content (see box "Main & Ad Cnt" in FIG. 3), the user of the main device MDev decides to push an advertisement to another person SDev. It then clicks on its remote control to initiate the process. The main reception device can then immediately react and propose a menu to continue the process (see box "Select Ad Tp" in FIG. 3) or can record the user's action for a later recall and start of the process.

The process comprises several menus and the first one is the selection of the advertisement. The menus can be in a different order without modifying the concept of the invention.

Different manners to realize the selection of the advertisement topic and the retrieval of the ad identifier will be then described.

According to a first mode of implementation, the currently displayed advertisement, which was transmitted to the main device at the time the user's first action was initiated, is proposed to be pushed. This is illustrated by the arrow T1 in the FIG. 2. In this case, the ad AD6 is the current advertisement. The transmitted audio/video content, and in particular the advertisement, contains metadata describing the video content currently transmitted. The metadata comprises an ad record comprising at least the ad identifier allowing the management center to retrieve the corresponding ad content and could also comprise a short description (ad descriptor) of the advertisement. In case of the presence of the ad descriptor in the ad record, the description is displayed on the main device screen and the user can confirm the selection of this advertisement topic for sharing it with a secondary device. The ad identifier, extracted from the metadata will be then used to identify the advertisement content to be pushed (see box "Select Ad ID" in FIG. 3).

Figure 1:
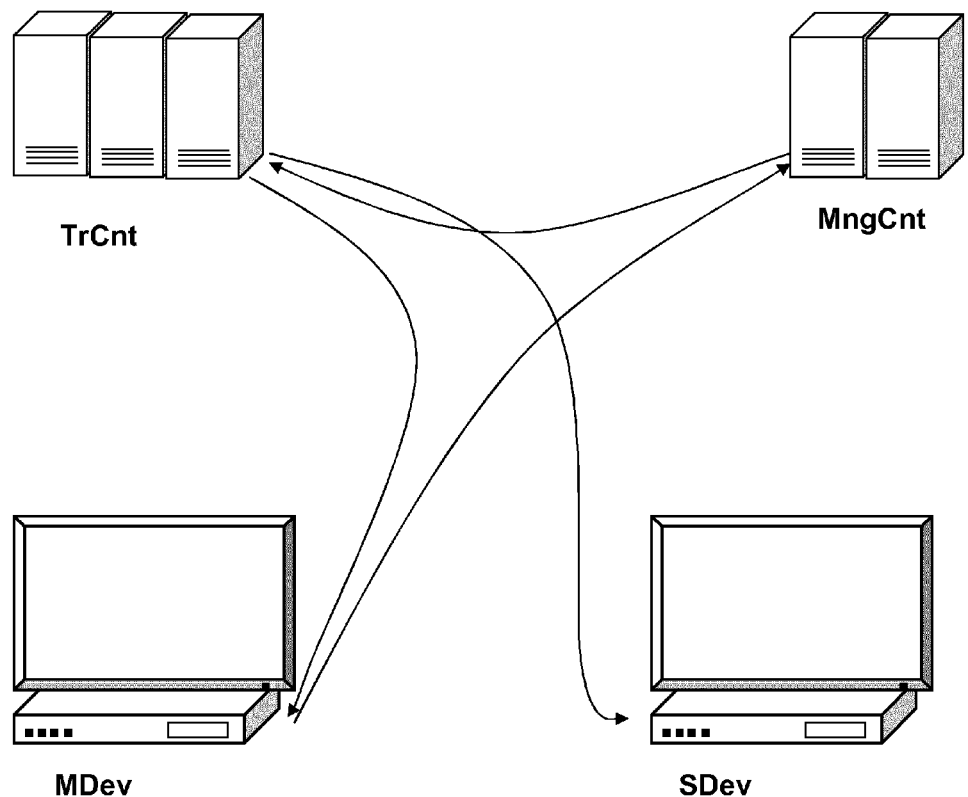
FIG. 1 illustrates the system of the invention with a transmission center, a main and a secondary device and a management center.
Figure 2:
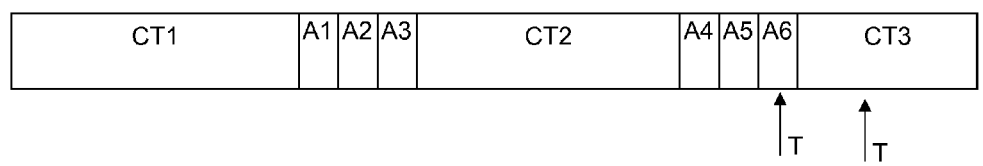
FIG. 2 illustrates the transmitted content with alternated main and ad contents.

According to a variation of this mode, the menu can display not only one advertisement description but a list of the n previously transmitted advertisements. The FIG. 2 illustrates the transmission of 6 advertisements prior to the action of the main user. The user can then select, among for example the 6 advertisements, the one to be pushed to the secondary device. For that purpose, according to one mode of realization, the metadata currently transmitted comprises the list of the last n advertisements. According to an alternate embodiment, each ad record comprises the ad identifier and the ad descriptor of the current advertisement. The main device can therefore store the ad records in a buffer, for example the last 6 advertisement records, and this buffer will be used to build-up the list of the last 10 advertisements. In the FIG. 2, each time an advertisement is detected by the main device, the ad record is extracted. The main device will therefore store the ad record of the AD1 to AD3 during a first batch of advertisements and the AD4 to AD6 during the second batch. In case that the user starts the process during the transmission of a main content, as shown by the arrow T2, the list of the previously stores ad descriptors will be displayed.

According to a second mode of implementation, the metadata contains extended information about a transmitted advertisement. The extended information relates to advertisements of the same manufacturer or the same type of products. For a well known sport gear provider, the current advertisement can refer to running shoes. However, the metadata can list, for the same manufacturer, the family of products for which an advertisement can be pushed. The selection menu can propose:

| | |
|---|---|
| Running shoes Men | Clothing |
| Running shoes Women | Accessories |
| Running shoes Kids | |

For each listed item, an ad identifier is attached. When the user has selected the one of interest, the ad identifier is extracted.

According to a third mode of implementation, the identification of the advertisement is carried out by identifying the transmitted video content and the time. The transmitted video content can be identified by a channel identifier or from the metadata. This channel identifier is contained in the PAT (Program Application Table) which comprises the description of all streams available from the current tuned band. A first example would be: channel 0x0017, time 17:35:23. This set of data will be the ad identifier. In case that the metadata of the video content is used, for example for a video on demand, the description of the content (or the identification of the content) can be used with the index (time, frames or packets) to identify the location at which the user's as started the process (e.g. ad identifier="Planet of the apes" and 1:34:12).

According to a fourth mode of implementation, the user's command received by the main device trigs the storage of data allowing identifying the video content currently transmitted. This could be in the form as described above with the channel/time indication or description/index. We will call it "content pointer" since these information allow to retrieve the content transmitted at a given time. Another possibility is to store a portion of the current transmitted content for identifying the advertisement topic. The portion of the current transmitted content comprises at least one image at the time of the user's command, this image containing at least one advertisement topic that the user is willing to push to the secondary device. This image can be sent to the management center for analysis. Another possibility is to pre-process the image on the main device to determine a snapshot, i.e. one object of the image that will be of interest by the user. The user of the main device can highlight with a cursor one object of the image or crop the image to keep only one object. A snapshot is generated following the crop function representing the advertisement topic by the main device and can be sent to the management center.

Then the content pointer, the image or the snapshot is sent to the management center for determining one or more advertisement identifiers. The management center, with the content pointer can retrieve one or a plurality of ad records containing a descriptor and an identifier from its database and can send it to the main device. Alternatively, the content pointer can be used to retrieve, in a buffer of the management center, the image or images at the time of the user's command and from an analysis of this image, can determine an ad record or a list of ad records. With the image or the snapshot, the management center can perform the analysis of the image or snapshot and determine the ad record or the list of ad records, which are then sent to the main device. The analysis is carried out is three steps, the first is the detection of objects by an object recognition application. The same process is carried out on the snapshot to determine the object of interest. Once the image or snapshot is passed through this application, an object or a list of objects is produced. The second step is to access a database to seek if ad contents match one of the retrieved object(s). The database contains a plurality of ad contents and keywords associated with each ad content. A keyword can be an object (e.g. car, truck or wristwatch) and/or a location (e.g. coffee place, supermarket, garage). The management center detects the keywords that match the detected object(s). The third step is to establish a list of possible ad records having the highest probability to be linked with the image or snapshot analyzed.

The analysis function can return more than one advertisement (i.e. ad records) since the image or snapshot can contain more than one object. As a result, the analysis and search function will produce an ad record or a list of ad records.

A more simple way to establish this list of ad records, according to another embodiment, is to preprocess the main content (the video) to generate in advance or in real-time a list of ad records indexed with the flow of the main video. The object recognition application is executed on the main content in order to detect objects matching one of the prerecorded advertisements. The purpose is to detect all objects related to an ad content already stored and discard the objects for which no ad content can be pushed. As an example, the management center contains an advertisement for shoes. Each time the analysis of the image of the main video detects shoes, a flag is recorded in respect with the index of the main video, the flag comprising the pointer to the ad record corresponding to the advertisement for shoes.

Once the management center receives a request indicating a particular time in the main content, the management center retrieves the list of flags recorded for that time (or around that time). This list is used to populate the list of ad records related to the pointed image and is sent back to the main device.

An ad record can contain a unique value, the identifier, allowing locating the proper advertisement content in the management center, and a short description. It is the short description that will be displayed on the main device screen for the selection by the user.

Once the main device has obtained the ad identifier, or selected one among the list of ad identifiers, these steps being illustrated by the box "Select AD ID", the next step is the selection of the destination address (see box "Select Destination" in FIG. 3).

According to the preferred embodiment, the main device contains a list of contacts with names and addresses. The addresses can comprise various fields such as the email, the Twitter© or Facebook© ID or an IP address.

Once the selection of the contact is made by the user, the notification can be prepared by the main device, this notification comprising the ad identifier, the destination address (in one of the forms described above) and the user's identification as illustrated by the box "Add Own ID" in the FIG. 3. The user's identification is stored in the main device and can be in the form of an email address, an IP address, an identification pertaining to the transmission center, a Twitter© or Facebook© identification.

An optional step is the possibility to add free text by the main user to be communicated to the secondary user. This could be in the form of the use of a list of preprogrammed texts, or directly typed by the main user.

The notification is now ready and can be sent to the management center (see box "Send Notif" in FIG. 3.

When the management center receives the notification, the record stored in the database related to the user's identification is checked. This check is optional and aims at deciding if the user, identified by the user's identification is allowed to send advertisements to others.

The second operation is to define the destination address (see box "Select Destination Adr" in FIG. 3). According to one embodiment, the destination address contained in the notification can be directly used to determine the physical address of the secondary device. However, in other cases, the physical address of the secondary device has to be retrieved from the received destination address. The management center can comprise a database having for each physical destination device, the logical name (such as e-mail etc). The management center carries out an address conversion to establish the physical address of the secondary device based on the received destination address.

It is to be noted that a physical destination address can be linked with more than one destination user. The same secondary device can be shared with a plurality of users.

The next step, optional as well, is the verification that the secondary device has allowed the transmission of advertisements. For this check, the database record related to the destination address is retrieved and verified. In the case that the secondary device has not allowed the reception of pushed advertisements, the process stops.

With the ad identifier contained in the notification, the management center can determine which advertisement content should be transmitted to the secondary device (see box "Select Ad content" in FIG. 3). The pushing operation can now start. This operation will be described with the example of the management having a direct connection with the secondary device, but the transmission can also be done in the same manner by the transmission center.

On the database of the management center, the record corresponding to the user of the main device and the record corresponding to the user of the secondary device are updated, for various purposes (see box "Record MDev Data" in FIG. 3). One of the purposes is to credit this main user with loyalty points for participating to an ad campaign. A second purpose is to build-up a user's profile, in particular concerning the secondary user.

The advertisement content can be simply pushed to the secondary device SDev, at the destination address as determined by the management center. In this case, the secondary device can receive a notification that advertisement content was pushed to its device and display a pop-up menu to request the user's authorization to display it. The pop-up menu can also display the name of the user from which the advertisement content is originated. The user of the secondary device can play the ad content straight away or can deny the immediate viewing. In this case, the ad content is stored and can be retrieved at a later time by the secondary user.

According to an alternate embodiment, the management center can check if the secondary device is online and put in a queue the ad content in the negative event. This check is carried out by the transmission of a short notification requesting an acknowledgement. Other automatic embodiment could be used such as detecting when the secondary device access the management center to obtain other data such as access keys for the content or information data about contents. If the acknowledgment is received, the secondary device is online. The management center checks on a regular basis the response of the secondary device and once detected, can push the ad content.

In the case that the secondary user approves the reception displays of the ad content (see box "Accept AD Content" and "Display AD content" in FIG. 3), an acknowledgment can be sent to the management center (see box "Acknowl. AD" in FIG. 3). Before sending the acknowledgment to the management center, the secondary user has the possibility to add a free text message. This acknowledgment, including the free text (if any) is sent to the management center and the record of the main user is updated (see baox "Update MDev data" in FIG. 3), for example by adding loyalty points. The free text message can be passed back to the main device so that the user of the main device can have a feedback about the accuracy of its selection.

The advertisement content can be displayed in full screen mode on the secondary device, or in a window or a banner on part of the screen. The secondary user has the possibility to evaluate the pertinence of the advertisement content by a selection between like/dislike or having a finer granularity such as between 0 to 5, 0 being equal to "dislike" and 5 being equal to "very interesting".

The loyalty points credited to the main user can be adjusted as a function of the secondary user feedback.

Once displayed on the secondary device's screen, according to a preferred embodiment, the ad content is deleted.

According to another embodiment, and in complement with the already described operations, the user at the main device can add a free text in the notification sent to the management center. This free text will be displayed in the notification received by the secondary device inviting an acceptance of the ad content. The secondary device's user will then have the possibility to visualize information about the sender and the comments made by the sender before accepting the advertisement.

The invention claimed is:

1. A method comprising:
receiving primary content on a first device associated with a user identification, the primary content being received with metadata that identies content topics available for selection, each of the content topics being associated with the received primary content and with a corresponding topic identifier;
presenting a selection interface on the first device, the presented selection interface specifying the content topics associated with the received primary content and identified by the metadata received with the primary content, the presented selection interface enabling user selection of a content topic from among the content topics associated with the received primary content and identified by the metadata received with the primary content;
determining a topic identifier that corresponds to a content topic selected via the presented selection interface from among the available content topics associated with the received primary content and identified by the metadata received with the primary content;
selecting a destination identifier corresponding to a second device; and
sending a notification to a management system, the notification comprising at least the topic identifier, the destination identifier, and the user identification, the notification causing the management system to provide secondary content that corresponds to the selected content topic associated with the received primary content to the second device based on the selected destination identifier and based on the topic identifier that corresponds to the content topic selected from among the available content topics associated with the received primary content and identified by the metadata received with the primary content.

2. The method of claim 1, further comprising:
transmitting, to the management system, information allowing identification of an object from a portion of the primary content; and
receiving at least one advertisement record determined by the management system based on the object identified from the portion of the primary content, the at least one advertisement record comprising the topic identifier that corresponds to the content topic selected via the selection interface presented on the first device.

3. The method of claim 2, wherein:
the information allowing identification of the object from the portion of the primary content includes an image included in the portion of the primary content, the image depicting the object.

4. The method of claim 3, wherein:
the information allowing identification of the object from the portion of the primary content includes a cropped version of the image, the cropped version depicting the object.

5. The method of claim 3, wherein:
the information allowing identification of the object from the portion of the primary content includes a highlighted version of the image, the highlighted version indicating the object.

6. The method of claim 1, wherein the management system receives an acknowledgment that the second device has processed the provided secondary content, the acknowledgment being recorded in a database of the management system in a user record corresponding to the user identification.

7. The method of claim 1, wherein the management system provides the secondary content to the second device by inserting the secondary content into a stream transmitted to the second device.

8. The method of claim 1, wherein the management system provides the secondary content to the second device by transmitting the secondary content via a point-to-point communication channel.

9. A system comprising a transmission system, a management system having a database and being communicatively coupled to a first device associated with a user identification, the first device being configured to perform operations comprising:
- receiving primary content from the transmission system, the primary content being received with metadata that identifies content topics available for selection, each of the content topics being associated with the received primary content and with a corresponding topic identifier;
- presenting a selection interface that specifies the content topics associated with the received primary content and identified by the metadata received with the primary content, the presented selection interface enabling user selection of a content topic from among the content topics associated with the received primary content and identified by the metadata received with the primary content;
- determining a topic identifier that corresponds to a content topic selected via the presented selection interface from among the available content topics associated with the received primary data and identified by the metadata received with the primary content;
- selecting a destination identifier corresponding to a second device; and
- sending a notification to the management system, the notification comprising at least the topic identifier, the destination identifier, and the user identification;

and at least one of the management system or the transmission system being configured to perform operations comprising:
- in response to the notification sent by the first device, providing secondary content that corresponds to the selected content topic associated with the received primary content to the second device based on the selected destination identifier and based on the topic identifier that corresponds to the content topic selected from among the available content topics associated with the received primary content and identified by the metadata received with the primary content.

10. The system of claim 9, wherein the management system is configured to perform further operations comprising:
- receiving, from the first device, information allowing identification of an object from a portion of the primary content;
- determining at least one advertisement record based on the object identified from the portion of the primary content, the at least one advertisement record comprising the topic identifier that corresponds to the content topic selected via the selection interface presented on the first device; and
- providing the at least one advertisement record to the first device.

11. A first device for sharing secondary content with a second device, the first device being associated with a user identification, the first device being configured to perform operations comprising:
- receiving primary content along with metadata that identifies content topics available for selection, each of the content topics being associated with the received primary content and with a corresponding topic identifier;
- presenting a selection interface that specifies the content topics associated with the received primary content and identified by the metadata received with the primary content, the presented selection interface enabling user selection of a content topic from among the content topics associated with the received primary content and identified by the metadata received with the primary content;
- determining a topic identifier that corresponds to a content topic selected from the presented selection interface from among the available content topics associated with the received primary data and identified by the metadata received with the primary content;
- selecting a destination identifier corresponding to a second device; and
- sending a notification to a management system, the notification comprising at least the topic identifier, the destination identifier, and the user identification, the notification causing the management system to provide the secondary content that corresponds to the selected content topic associated with the received primary content to the second device based on the destination identifier and based on the topic identifier that corresponds to the content topic selected from among the available topics associated with the received primary content and identified by the metadata received with the primary content.

12. The first device of claim 11, wherein the operations further comprise:
- transmitting, to the management system, information allowing identification of an object from a portion of the primary content; and
- receiving at least one advertisement record determined by the management system based on the object identified from the portion of the primary content, the at least one advertisement record comprising the topic identifier that corresponds the content topic selected from the presented selection interface.

13. The system of claim 10, wherein:
the information allowing identification of the object from the portion of the primary content includes an image included in the portion of the primary content, the image depicting the object.

14. The system of claim 13, wherein:
the information allowing identification of the object from the portion of the primary content includes a cropped version of the image, the cropped version depicting the object.

15. The system of claim 13, wherein:
the information allowing identification of the object from the portion of the primary content includes a highlighted version of the image, the highlighted version indicating the object.

* * * * *

UNITED STATES PATENT AND TRADEMARK OFFICE
CERTIFICATE OF CORRECTION

PATENT NO. : 10,523,600 B2  
APPLICATION NO. : 15/523903  
DATED : December 31, 2019  
INVENTOR(S) : Cuzin et al.

Page 1 of 1

It is certified that error appears in the above-identified patent and that said Letters Patent is hereby corrected as shown below:

On the Title Page

On page 2, in Column 2, Item (56) under "Other Publications", Line 1, delete "issued issued" and insert --issued-- therefor In the Claims In Column 7, Line 66, in Claim 1, delete "identities" and insert --identifies-- therefor In Column 9, Line 34, in Claim 9, after "identification;", insert --and--

In Column 9, Line 35, in Claim 9, before "at", delete "and"

Signed and Sealed this  
Fifth Day of January, 2021

Andrei Iancu  
*Director of the United States Patent and Trademark Office*